Aug. 21, 1956  F. N. ROTHACKER  2,760,046
ELECTRONIC TEMPERATURE CONTROL DEVICE
Filed Nov. 30, 1953  2 Sheets-Sheet 1
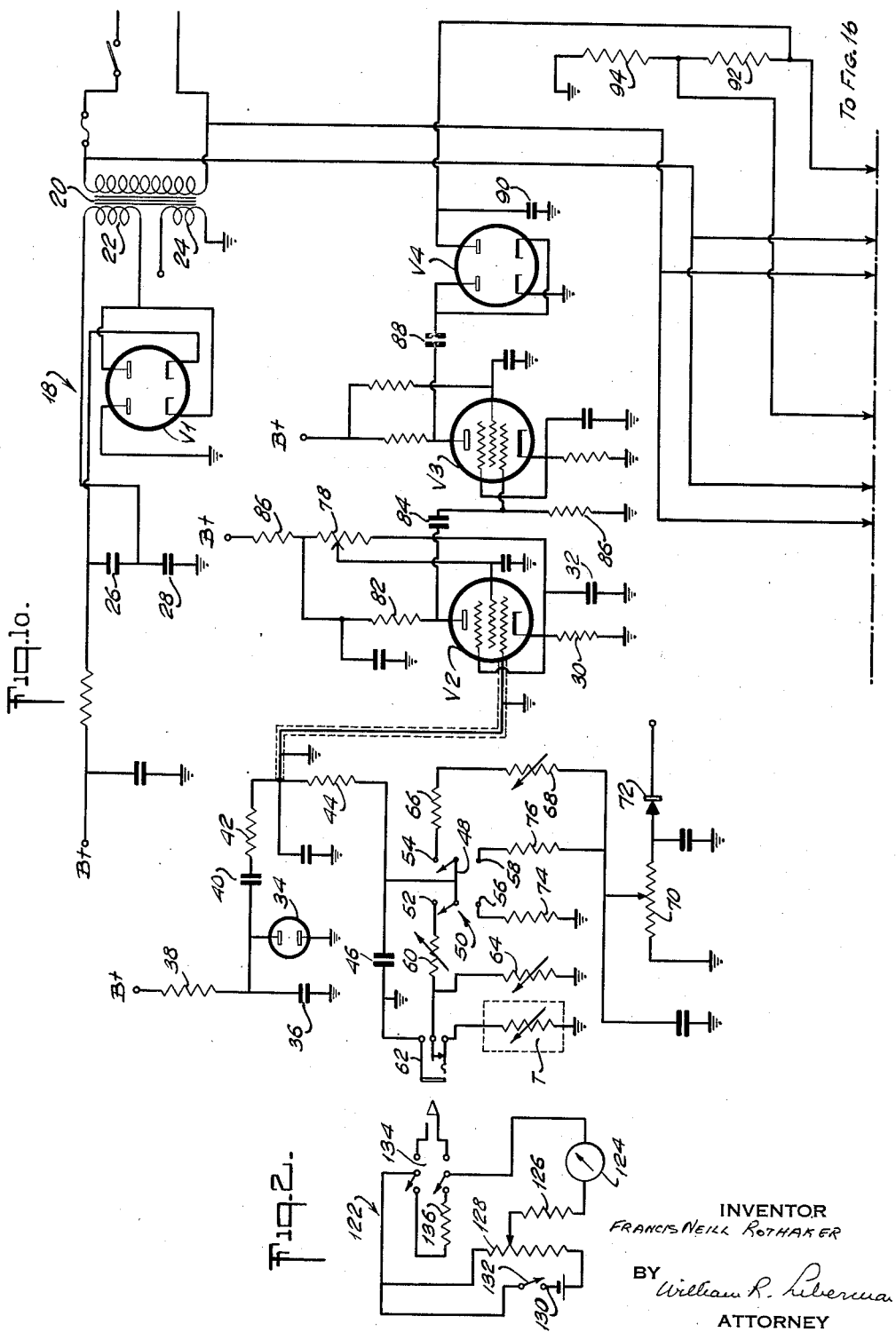
INVENTOR
FRANCIS NEILL ROTHACKER
BY William R. Lieberman
ATTORNEY

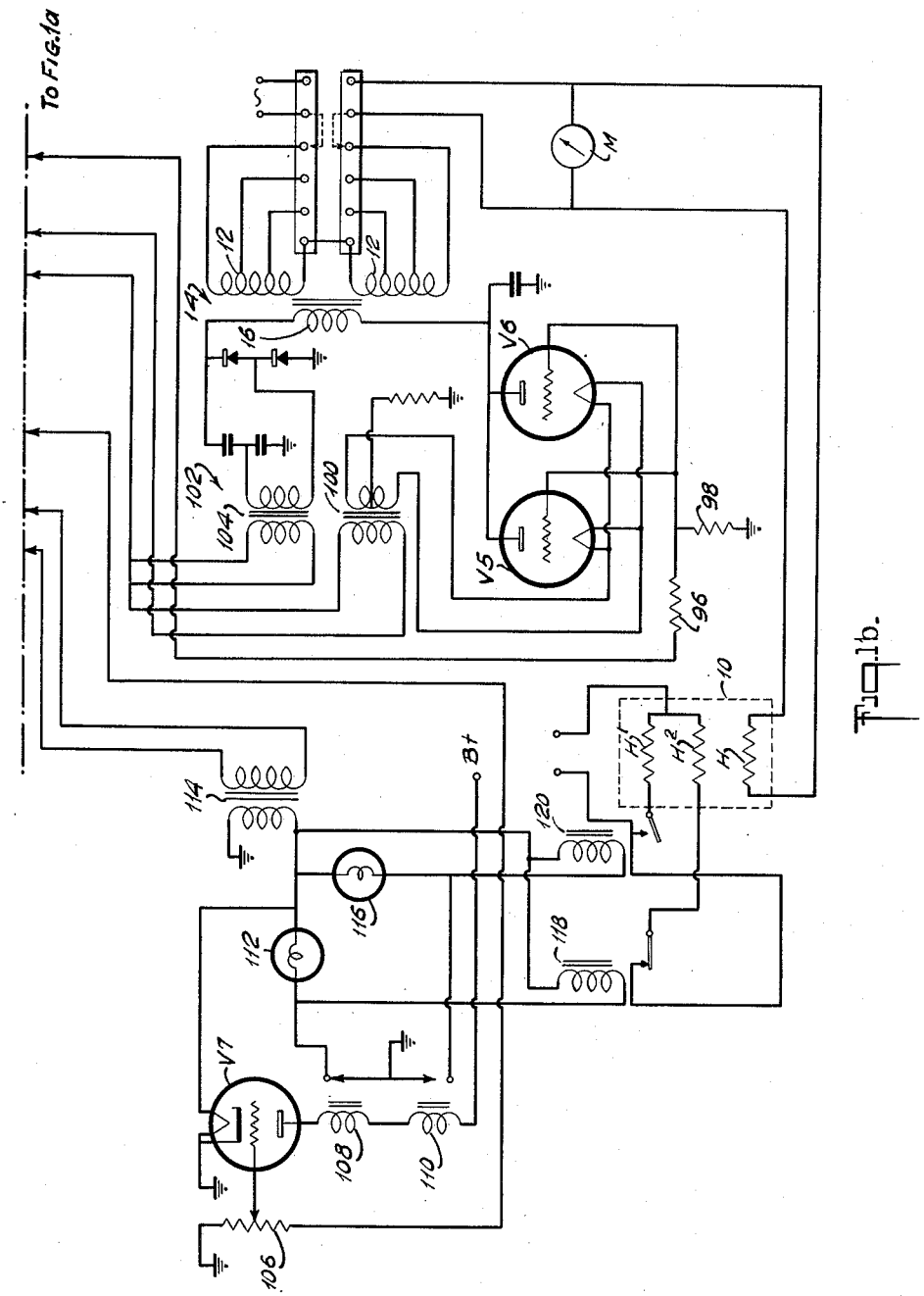

United States Patent Office 2,760,046
Patented Aug. 21, 1956

2,760,046

ELECTRONIC TEMPERATURE CONTROL DEVICE

Francis Neill Rothacker, East Orange, N. J., assignor to Modern Plastic Machinery Corp., Lodi, N. J., a corporation of Delaware Application November 30, 1953, Serial No. 395,007

8 Claims. (Cl. 219—20)

The present invention relates to improvements in electrical control devices and it relates more particularly to an improved electronic temperature control device for use in plastic extruding machines and similar equipment.

There are many processes requiring very close temperature control which involve activities which are both endothermic and exothermic at rates which vary uncontrollably with time. Typical of these processes is the extrusion of organic plastics to form elongated shapes such as tubes, rods and the like. The organic plastic, in granular or powdered form, is fed into a hopper and is transported by a screw or similar conveyor through a heated barrel where the temperature of the organic plastic is raised bringing the organic plastic to a fluid state. The fluid organic plastic is forced through a heated extrusion die at the terminus of the barrel by virtue of the conveyor, the opening in the die being of the desired shape, and the extruded organic plastic is suitably cooled in accordance with well known practices. In the conventional organic plastic extruding machine it is necessary to maintain different temperatures at different points along the barrel and at the extrusion die. Inasmuch as the rate of feed of the plastic may vary with time and consequently the heat required to bring the plastic to the desired fluid state it is necessary to vary the heat energy fed to the various zones along the barrel and extrusion die. Further variables which enter into the heat requirements of the system are varying fractional heats generated, varying requirements of different plastics, ambient cooling conditions etc. Since the heating is generally effected by means of independently energized electric resistance heating elements temperature control has been achieved by varying the current to the electrical heating elements in accordance with the temperatures in the corresponding zones of the barrel and extrusion die or by the energizing or deenergizing of the heating elements in an on and off manner as the respective temperatures fall and rise below and above a predetermined point. However, the degree of temperature control achieved by the conventional system falls far short of that desired and results in high inefficiency in operation as well as inferior and nonuniform end products. For example, where the on and off system of heating is employed the temperatures in the different zones vary over a wide range and hunting is present to a large degree.

Furthermore, the on and off system as well as the automatic current varying systems heretofore employed are characterized by their inflexibility, low sensitivity, large drift with varying line voltage and many other disadvantages which lead to losses and inefficiency.

It is thus a principal object of the present invention to provide an improved automatic electric control device.

Another object of the present invention is to provide an improved electronic temperature control device.

Still another object of the present invention is to provide an improved temperature control device particularly applicable to the regulation of the heat delivered to the various zones of the barrel and to the die of an organic plastic extruding machine.

A further object of the present invention is to provide an improved temperature control device for regulating the current delivered to an electric resistance heating element in response to the temperature in a predetermined heating zone, which device automatically compensates for variations in line voltage in a manner anticipating changes in temperature.

Still a further object of the present invention is to provide an improved temperature control device for organic plastic extrusion machines, which device is characterized by its flexibility and accuracy.

Another object of the present invention is to provide an improved temperature control device for organic plastic extruding machines, which device is of adjustable sensitivity and permits a full range of control substantially independent of the sensitivity.

The above and further objects of the present invention will become apparent from a reading of the following description taken in conjunction with the accompanying drawing wherein:

Figures 1a and 1b are schematic diagrams of the improved temperature control device in accordance with the present invention; and Figure 2 is a schematic diagram of an auxiliary temperature measuring device for use with improved control device.

The present invention broadly contemplates the provision of an improved automatic temperature control device comprising a saturable core reactor having a control and a controlled winding, an electric resistance heating element disposed in a heating zone and connected through said controlled winding to a power line source of alternating current, a temperature sensitive resistance element positioned in said heating zone, an amplifier having an input and an output, means for adjusting the amplification of said amplifier, means for applying an A. C. signal to said input, means responsive to said temperature sensitive resistance element for applying a D. C. signal to said input whereby to vary the output signal of said amplifier, means for adjusting the rate of response of said D. C. signal applying means and means for applying a direct current to said saturable core reactor control winding in accordance with the output signal of said amplifier.

Another feature of the present invention resides in automatically varying the D. C. signal applied to the amplifier input, in accordance with the line voltage in a manner whereby a rise in line voltage is accompanied by a corresponding drop in the amplifier output signal and a rise in the current through the saturable core reactor control winding and vice-versa, a drop in line voltage is accompanied by a rise in the amplifier output and a drop in the current control winding. It has been found that the heat requirements during operation of a conventional plastic extruding machine drop with a drop in line voltage since the extrusion rate decreases and the frictional heat generated increases. Thus by reducing the heating energy delivered to the various heating zones during a line voltage drop and by increasing the energy during a rise in line voltage the changed heat requirements are anticipated and compensated for.

Another feature of the present invention resides in the provision of a pair of supplementary heaters and means for energizing both of said heaters when the temperature in said heating zone falls below a first predetermined point, deenergizing both of said heaters when said temperature rises above a second predetermined point, and energizing one of said heaters when said zone temperature is between said first and second predetermined points.

In accordance with a preferred embodiment of the present invention, the amplifier includes a pentode input tube the control grid of which is connected to the output of a relaxation type audio oscillator. The control grid is also connected through a voltage dividing network including a thermistor defining the temperature sensitive resistor and a variable resistor to the negative terminal of an adjustable source of D. C. potential whose positive terminal is at a lower potential than the pentode cathode and whose value varies with line voltages. The thermistor is connected between the control grid and the positive terminal of the D. C. grid potential source and the variable resistor is connected between the control grid and the negative terminal. Thus a rise in temperature in the heated zone is accompanied by an increase in the output signal of the pentode and a drop in temperature by a decrease in the output signal. The grid D. C. potential source includes a transformer connected to the A. C. power line, the secondary output of which is rectified and applied to a capacitor shunted by the resistor of a potentiometer, the arm of which defines the negative terminal of the potential source. The screen grid of the input pentode is connected to an adjustable voltage dividing network which controls the voltage applied to the screen grid and hence the amplification of the pentode. The output signal of the first pentode is amplified by a second pentode the output of which is rectified and the negative signal applied to the control grids of a pair of parallel triodes which are connected in a series with the control winding of the saturable core reactor and a source of D. C. voltage. Hence, any rise in the temperature of the heated zone is followed by a drop in thermistor resistance, an increase in amplified output signal and negative signal applied to the triodes resulting in a drop in the control winding current, an increase in reactor impedance and a decrease of the current through the heater element. Similarly a drop in temperature in the heated zone is accompanied by a rise in the heater current. The supplementary heaters are controlled by two sets of relays which respond through an amplifier tube to the rectified output of the main control amplifier. Pilot lights are provided to indicate the operation of the supplementary heaters.

Reference is now made to the drawing which illustrates a preferred embodiment of the present invention wherein the numeral 10 generally designates a heated zone whose temperature it is desired to regulate and which may constitute a section of the barrel of an organic plastic extruding machine, an extrusion die or other comparable component of equipment. The temperature of the zone 10 is raised and maintained by an electrical resistance heater H the current to which is controlled in a continuous fashion and, if desired, a pair of supplementary electrical resistance heaters H1 and H2 which are controlled in an off and on manner as will be hereinafter set forth. The heater H is connected through the controlled windings 12 of a multi-tapped saturable core reactor 14 to a line source of alternating current. Also located in the heated zone 10 is a thermistor T, a resistor having a large negative coefficient of resistance.

The saturable core reactor 14 includes a control winding 16 which is regulated in response to the resistance of the thermistor T to thereby effect the regulation of the temperature in zone 10. The circuit network employed includes a plate power supply consisting of a power transformer 20 whose primary is connected to the line source of alternating current and which has a high voltage secondary winding 22 and a low voltage secondary winding 24 which latter supplies the current for the various tube filaments and for the D. C. signal supply to the control amplifier. Completing the plate power supply, which is of the voltage doubling type, is the double diode 21, a pair of capacitors 26 and 28 series connected between the high side and ground and a filtering resistor and a capacitor, the various elements being connected in the conventional manner.

The control amplifier includes an input pentode V2 whose cathode is grounded through a biasing network including the parallel connected cathode resistor 30 and capacitor 32. The control grid of the pentode V2 is connected by way of a shielded cable to the output of a relaxation type audio oscillator consisting of a glow discharge tube 34 and a capacitor 36 connected in a parallel between ground and the plate voltage supply by way of a resistor 38, the values of the capacitor resistor 36, 38 and the plate supply voltage being such as to produce an audio frequency signal. The high end of the capacitor 36 is connected through a capacitor 40 and a resistor 42 to the pentode V2 control grid which, in turn, is grounded through a resistor 44 and a high capacitance condenser 46.

The pentode V2 control grid is also connected through the resistor 44 to the electrically joined blades 48 of a double pole double throw switch 50 having upper poles 52 and 54 respectively and lower poles 56 and 58 respectively. The upper switch pole 52 is connected through variable resistor 60, the normally closed contacts of a plug receptacle 62 and the thermistor T to ground, the thermistor T being shunted by a variable resistor 64. The variable resistors 60 and 64 serve the purpose of compensating for resistance differences normally occurring in conventional thermistors. The other upper switch pole 54 is connected through the series connected resistor 66 and variable resistor 68 to the arm of a potentiometer 70. The variable resistor 68 is suitably calibrated and is employed to set and adjust the regulated temperature of the heated zone as will be hereinafter set forth. The resistance element of the potentiometer 70 is connected between ground and one end of a rectifying element 72, the other end of which is connected to a terminal of the low voltage secondary 24 of the transformer 20 the other terminal of which is grounded. The rectifying element 72 is so oriented that the grounded end of the potentiometer 70 is at a positive potential relative to the high end thereof.

The junction point of the resistance element of the potentiometer 70 and the rectifying element 72 and the arm of potentiometer 70 are each grounded through corresponding capacitors. It is thus apparent that variations in the line voltage are accompanied by corresponding variations in negative D. C. signal derived from the potentiometer 70 and applied to the control grid of the pentode V2. The lower pole 56 of the switch 50 is grounded through a resistor and the lower pole 58 is connected to the arm of potentiometer 70 through a resistor 76, the resistors 74 and 76 being of the same value.

The amplification or sensitivity of the pentode V2 is adjustable by virtue of its screen grid being connected to the arm of a potentiometer 78 whose resistance element has one end connected to the pentode cathode and its other end connected to the plate power supply through a resistor 80, to ground through a capacitor and to the pentode anode through a resistor 82. The pentode V2 screen grid is also grounded through a capacitor.

The plate of the pentode V2 is connected by way of a coupling capacitor 84 to the control grid of a second pentode V3 which is grounded through a grid resistor 86. The elements of the pentode V3 are connected in the conventional manner as illustrated, the anode being connected to an anode and a cathode of a double diode V4 by way of a coupling capacitor 88. The other cathode of the diode V4 is grounded and the other anode is connected to the upper terminal of a capacitor 90 the lower terminal of which is grounded. The potential of the upper terminal of capacitor 90 is negative with respect to ground being the rectified output of the pentode V3 and is of a value in accordance with the said output signal.

The upper terminal of the capacitor 90 is grounded through a first pair of series connected resistors 92 and 94 and a second pair of series connected resistors 96 and 98. The junction point of the resistors 96 and 98 are connected to the control grids of a pair of triodes V5 and V6 which triodes are connected in parallel and have their filaments connected to the secondary winding of a filament transformer 100 the center top of the said secondary winding being grounded. The anodes of the triodes V5 and V6 are joined and are connected through the control winding 16 of the saturable core reactor 14 to the positive terminal of a plate power supply 102 of conventional construction. The plate power supply 102 includes a power transformer 104 the secondary of which, together with a pair of capacitors and rectifiers, are connected as voltage doubling network as shown, the negative terminal being grounded and the positive terminal being connected to one end of the saturable core reactor control winding.

The control circuit network for the supplementary heaters H1 and H2 includes a triode V7 the cathode of which is grounded and control grid of which is connected to the arm of a potentiometer 106 whose resistance element is connected between ground and the junction point of resistors 92 and 94. The anode of triode V7 is connected through the series connected solenoids of relays 108 and 110 to the positive terminal of the plate voltage supply. The armatures of the solenoids 108 and 110 are adjustably spring biased and are normally adjusted so that each of the armatures are actuated upon different currents passing through the solenoids as will be set forth. The stationary contacts of the relays 108 and 110 are grounded, whereas the armature contact of the relay 108 is connected through a pilot light 112 to the high terminal of the secondary of a suitably energized transformer 114 whose low terminal is grounded. Similarly the armature contact of relay 110 is connected through a pilot light 116 to the high terminal of the secondary of the transformer 114. The armature contact of relay 108 is also connected through the solenoid of a relay 118 to the secondary of transformer 114 and the armature contact of relay 110 is connected through the solenoid of a relay 120 to said secondary. Furthermore, the heating element H1 is connected through the contacts of the relay 120 to the line voltage and the heating element H2 is connected through the contacts of relay 118 to the line voltage. The contacts of relays 108 and 118 are normally spring biased to closed positions and the contacts of relays 110 and 120 are spring biased to open positions. When the zone temperature is above a predetermined point, the negative signal to the triode V7 is high enough so that neither relay 108 or 110 is actuated by the plate current and the closed relay 108 causes the energizing of light 112 and the opening of the normally closed relay 118 so that neither of the heaters H1 or H2 is energized. Upon a drop in zone temperature below a predetermined high point, the negative signal to the triode V7 is reduced increasing the plate current through the solenoids of relays 108 and 110 to actuate relay 108, opening the relay contacts to thereby extinguish light 112, and deenergize the relay 118 so that its contacts close to energize the heater element H2. It should be noted that the spring biasing of the armatures of relays 108 and 110 are so adjusted that it requires less current to actuate relay 108 than relay 110, the difference being in accordance with the desired range of operation of the supplementing heaters H1 and H2. Upon the zone temperature dropping below a predetermined low point, the relay 110 is actuated closing its contacts to energize the light 116 and the solenoid of relay 120 thereby closing the contacts of relay 100 and energizing the second heater element H. Thus the energization of pilot lights 112 and 116 and heaters H1 and H2 are determined by the zone temperature, the pilot lights presenting a continuous indication of zone temperature range. The operating mid-point of the heaters H1 and H2 may also be adjusted by the potentiometer 106.

An auxiliary temperature measuring device 122 is provided which measures the resistance of the thermistor T as an indication of the temperature of the regulated heated zone 10. The device includes a milliammeter 124 one terminal of which is connected through a resistor 126 to the arm of a potentiometer 128 which shunts a standard battery 130 through a normally open push button switch 132. The other terminal of the milliammeter 124 is connected to one blade of a double throw pole switch 134, the other blade being connected to the resistance element 128. One pair of poles of the switch 134 are connected by a standard resistor 136 and the other pair are connected to the terminals of a plug 134. The meter 124 may be calibrated in degrees of temperature. By throwing the standard resistor 131 into the circuit by means of switch 134 and pressing pushbutton 137, the meter 124 may be calibrated and zeroed by means of the potentiometer 128. By throwing the switch 134 over to the plug side and inserting the plug 134 into the receptacle 62, the thermistor T is placed in series with the meter 124 and the battery 130 and the current through the meter 124 and hence its reading is a function of the resistance of thermistor T and the temperature of the zone 10. In the preferred embodiment of the present invention, the tubes V2 and V3 are of the 6AU6-type, the tube V4 a 6AL5, and the tubes V5 and V6, 6B4G and tube V7 6BF6. The thermistor in the illustrated embodiment has a resistance of approximately 70 ohms at 600° F. and approximately 5000 ohms at 212° F.

Considering now the operations of the improved control device, the voltage across heating element H as indicated on meter M is at a desired optimum mid-point of the zone temperature at a predetermined point. Any rise in the temperature of the heated zone 10 is accompanied by a drop in the resistance of the thermistor T. The switch 48 during regulation is in its upper position connecting the thermistor in the control grid circuit of the pentode V2, the thermistor forming part of a voltage dividing network whose resistance controls the negative signal applied to the pentode V2, the voltage dividing network including the resistor 66 and variable resistor 68. The variable resistor 68 has substantially the same range as the thermistor T and is preferably calibrated in temperature. When the zone temperature is at its desired value, the resistance of the thermistor and the combined resistors 66 and 68 are preferably substantially equal. A drop in the thermistor resistance reduces the negative D. C. signal on the pentode V2 control grid increasing the A. C. output thereof, that is, the amplified signal of the audio oscillator which is further amplified by pentode V3 and rectified by the double diode V4. The increased rectified negative output is applied to the grids of triodes V5 and V6 increasing their resistance and consequently reducing the current through the reactor control winding 16 increasing the impedance of the reactor and reducing the energy fed to the heated element H thus causing a drop in the zone temperature to the pre-set value. Similarly, a drop in zone temperature increases the thermistor resistance, the negative signal to the first pentode and reduces the rectified amplified negative signal applied to the triodes V5 and V6. The resulting increased reactor control winding current reduces the reactor impedance thereby increasing the energy fed to the heating elements H to increase the zone temperature. The operation and control of heating elements H1 and H2 have been previously described.

In starting up the equipment, the switch 48 is thrown to its lower position, the potentiometer 78 adjusted to the desired sensitivity and the potentiometer adjusted so that the voltage applied to the heater element H as indicated on the meter M is at its normal running value as has been predetermined. The switch 48 is then thrown to its upper position and the regulating control takes over. In the event that the operating heater voltage, equilibrium differs from that originally set, the switch 48 is again thrown to its lower position and the potentiometer 70 adjusted to bring the heater voltage to the equilibrium voltage. It is obvious from the above description that a drop in line voltage is accompanied by a drop in the negative signal applied to the pentode V2 as derived from the potentiometer 70 and hence a rise in the negative signal applied to the triodes V5 and V6 thereby decreasing the energy fed to the heater H which action is highly desirable as aforesaid. The component values entering into this compensation circuit may be such as to slightly overcompensate.

While there has been described and illustrated a preferred embodiment of the present invention, it is apparent that numerous alterations and omissions may be made without departing from its spirit.

I claim:

1. A device for regulating the temperature in a heated zone of an extrusion device comprising an electrical resistance heating element disposed in said zone, a saturable core reactor having a control and controlled winding, said heating element being connected to a line source of alternating voltage through said controlled winding, a resistor located in said zone and having a resistance value varying in accordance with the temperature thereof, an amplifier having an input and an output, means for adjusting the amplification factor of said amplifier, means for applying a uniform A. C. signal to said amplifier input, an adjustable source of D. C. voltage, a voltage dividing network including said temperature responsive resistor connected across said D. C. voltage source, an intermediate point on said voltage dividing network being connected to said amplifier input whereby a change in said resistance is accompanied by a change in the output signal of said amplifier and means for applying a D. C. current to said reactor control winding in accordance with said amplifier output signal.

2. A device in accordance with claim 1, including means presenting an indication of the voltage across said heating element.

3. A device in accordance with claim 1, wherein said voltage dividing network includes a temperature control variable resistor connected in series with said temperature responsive resistor across said adjustable source of D. C. voltage, a point between said resistors being connected to the input of said amplifier.

4. A device in accordance with claim 3, including first and second balancing resistors of substantially equal value and switch means for selectively replacing said temperature responsive resistor and said temperature control variable resistor by said first and second balancing resistors respectively.

5. A device in accordance with claim 1, wherein said amplifier includes a first vacuum tube having an anode, a cathode, a control grid and a screen grid, and means for applying a positive voltage to said screen grid relative to said cathode and for varying said voltage thereby to vary the amplification of said tube, said voltage applying and varying means defining said amplification factor adjusting means.

6. A device in accordance with claim 1, including means for varying the D. C. signal applied to the input of said amplifier in accordance with variations in said line voltage.

7. A device in accordance with claim 1, including means for measuring the resistance of said temperature responsive resistor as an indication of the temperature of said zone.

8. A device in accordance with claim 1, including first and second supplementary heating elements disposed in said zone, means for energizing said first supplementary heating element when said zone temperature falls below a first predetermined point and means for energizing said second heating element when said zone temperature falls below a second predetermined point lower than said first point.

References Cited in the file of this patent

UNITED STATES PATENTS

| | | |
|---|---|---|
| 2,119,108 | Lane | May 31, 1938 |
| 2,169,977 | MacDonald | Aug. 15, 1939 |
| 2,218,502 | Breitenstein | Oct. 22, 1940 |
| 2,234,184 | MacLaren | Mar. 11, 1941 |
| 2,496,860 | Davis | Feb. 7, 1950 |
| 2,505,565 | Michel et al. | Apr. 25, 1950 |
| 2,511,981 | Hanchett | June 20, 1950 |